CHARLES W. SIEMENS & F. SIEMENS.
Glass Furnace.

Patented June 11, 1872.

Fig. 1.

Fig. 2.
Section on line 2. 2.    Section on line 2ª 2ª.

Witnesses,
S. N. Piper
L. N. Möller

Charles W. Siemens,
Frederick Siemens,
by their attorney
R. M. Eddy

CHARLES W. SIEMENS & F. SIEMENS.
Glass Furnace.

No. 127,806.

Patented June 11, 1872.

Witnesses
S. N. Piper
L. N. Möller

Charles W. Siemens
Frederick Siemens
by their attorney
R. H. Eddy

CHARLES W. SIEMENS & F. SIEMENS.
Glass Furnace.

No. 127,806. Patented June 11, 1872.

Witnesses.
S. N. Piper
L. N. Möller

Charles W. Siemens
Frederick Siemens
by their attorney.
R. H. Eddy

CHARLES W. SIEMENS & F. SIEMENS
Glass Furnace.
No. 127,806. Patented June 11, 1872.

Witnesses.

Charles W. Siemens.
Frederick Siemens.
by their attorney

127,806

UNITED STATES PATENT OFFICE.

CHARLES W. SIEMENS, OF WESTMINSTER, ENGLAND, AND FREDERICK SIEMENS, OF DRESDEN, SAXONY.

IMPROVEMENT IN GLASS-FURNACES.

Specification forming part of Letters Patent No. 127,806, dated June 11, 1872.

*To all to whom these presents may come:*

Be it known that we, CHARLES WILLIAM SIEMENS, of Westminster, England, and FREDERICK SIEMENS, of Dresden, of the Kingdom of Saxony, have invented certain new and useful Improvements in Regenerative Gas-Furnaces and apparatus connected therewith for the manufacture of glass, the said invention being applicable in whole or in part to other regenerative gas-furnaces; and we do hereby declare the same to be fully described in the following specification and represented in the accompanying drawing.

One part of this invention has reference to an improved construction of the gas-producers of regenerative gas-furnaces for the manufacture of glass and for other purposes.

In working gas-producers of the form and arrangement described in the specification to Letters Patent granted to us in Great Britain, bearing date 22d January, 1861, No. 167, considerable loss of effect and inconvenience in working have arisen in consequence of the condensation of tar and soot in the flues leading from the gas-producers to the furnaces, the cause being that the carbonic-oxide gas produced in the lower portions of the apparatus near the grate mixed within the flues with the volatile hydrocarbons and other vapors distilled off from the fuel in the upper part of the producer, which gases, not being in a permanently gaseous condition, were thereby condensed to a considerable extent and deposited in the form of tar and soot.

Now, the present improvements have for their object to prevent such losses of the volatile gases by causing them, before passing into the gas-mains, to become of a more permanent nature than when first disengaged from the fuel. For this purpose we construct the gas-producers with one or more separate chambers or compartments behind the combustion-chamber, so arranged that the volatile gases given off at the upper part of the layer of fuel in the combustion-chamber are caused to descend into the lower portion of the back chamber or chambers, where they are brought into contact with the lower highly-heated portion of the fuel and with highly-heated surfaces, thereby being converted into permanent hydrogen and carbonic-oxide gases, while, at the same time, they are caused to mix with the highly-heated permanent combustible gases produced in the lower part of the combustion-chamber. These combined gases then rise up through the back chamber or chambers and pass into the main gas-flue. Variously-modified arrangements of such improved construction of gas-producers may be employed.

Figure 1:
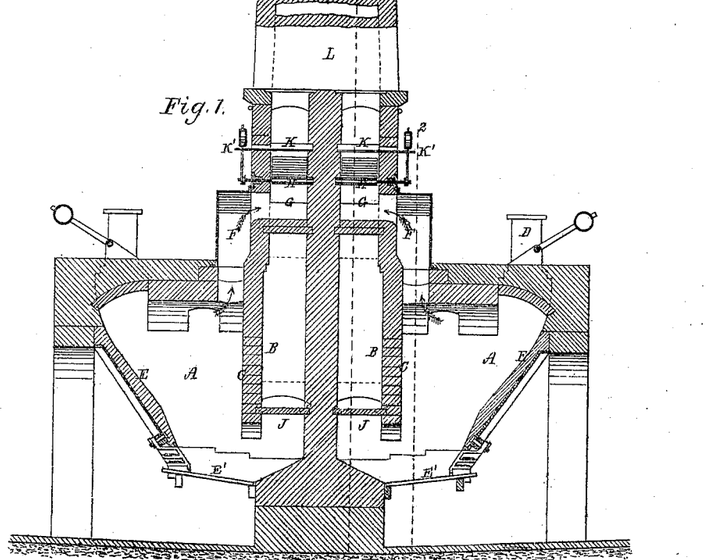
Figure 2:
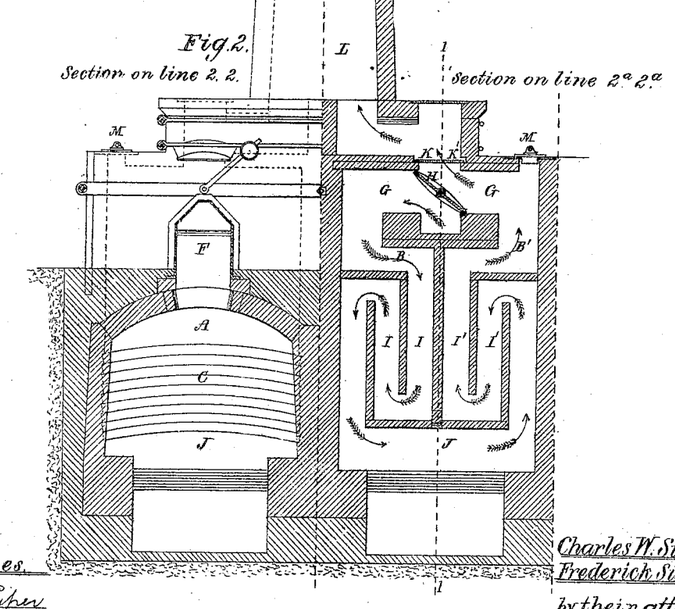

Figures 1 and 2 of the drawing show the arrangement which we prefer to employ, Fig. 1 being a vertical section on line 1 1 of Fig. 2; and Fig. 2 being two different sections taken, respectively, on lines 2 2 and $2^a$ $2^a$ of Fig. 1.

Similar letters of reference indicate similar parts in each of the figures.

The producers are here shown in duplicate, arranged back to back; but they may equally well be arranged in a single row. In this arrangement the producer consists of the front or combustion chamber A and the two back chambers B B', separated from the combustion-chamber by the partition-wall C passing down to within a short distance from the fire-grate. The combustion-chamber is of the ordinary construction, the fuel being introduced through the hopper D and caused to pass in a thick layer down the inclined fire-brick plane E onto the grate E' at the bottom until the chamber is filled above the top of the arches in the bottom of the wall C. The top of the combustion-chamber communicates with the upper ends of the chambers B B' through a passage, F, opening into a passage, G, common to both the back chambers, with which the passage F is made to communicate alternately by means of the reversing-valve H. In the chambers B B' are formed zigzag flues I I I' I', communicating with the passage G at top, and at bottom with the space J, also common to both the chambers, and opening into the combustion-chamber A below the partition-wall C, and below the top of the fuel. The upper passage G also communicates through the opening K with the main gas-flue L leading to the furnaces, which opening is so arranged that, when the valve H is in the position for establishing a communication between the top of the combustion-chamber and the one back chamber, it, at the same time, establishes a communication between the other back chamber and the gas-flue L. From this arrangement it will be seen that, assuming the reversing-valve H to be in the position shown at Fig. 2, the volatile gases distilled off from the upper part of the layer of fuel in the combustion-chamber, instead of escaping directly into the gas-flue L, as was heretofore the case, are prevented by the coal which closes the arch in wall C, and are caused by the draught to pass through the passages F and G into the compartment B, where they traverse the zigzag passages I, which are heated partly by the combustion going on in the chamber A and partly by the previous passage of hot gases, as presently described. From the flues I the gases issue in a considerably-heated state into the space J, where they become further heated to a high degree by being brought into contact with the lower highly-heated portion of the layer of fuel on the grate, and by mixing at the same time with the highly-heated carbonic-oxide and other gases generated from the lower part of the layer of fuel, and thus the conversion of these volatile gases into permanent hydrogen and carbonic-oxide gases is effected. From the space J these combined gases are now caused, by the draught from the gas-flue L, to rise into the chamber B′, where, in traversing the zigzag flues I′, they are made to give off a portion of their heat to the walls of the chamber before issuing through the passage G and opening K into the gas-flue L. When by this means the chamber B′ has become considerably heated, while the chamber B has become cooled by the passage of the cooler volatile gases, the position of the valve H is reversed, so as to cause the volatile gases to descend through and take up heat from the chamber B′, while the hot gases rise up through and give off heat to the chamber B, the chambers B B′ being thus made to act to a certain extent as regenerators. Stoppered apertures are provided at M, through which access can be gained to the passages of the chambers B B′ for the removal of any deposits of soot or tar that may take place. The opening K is also provided with a sliding damper, K′, for regulating the draught and closing the communication between the producer and the main gas-flue, when required.

Figure 3:
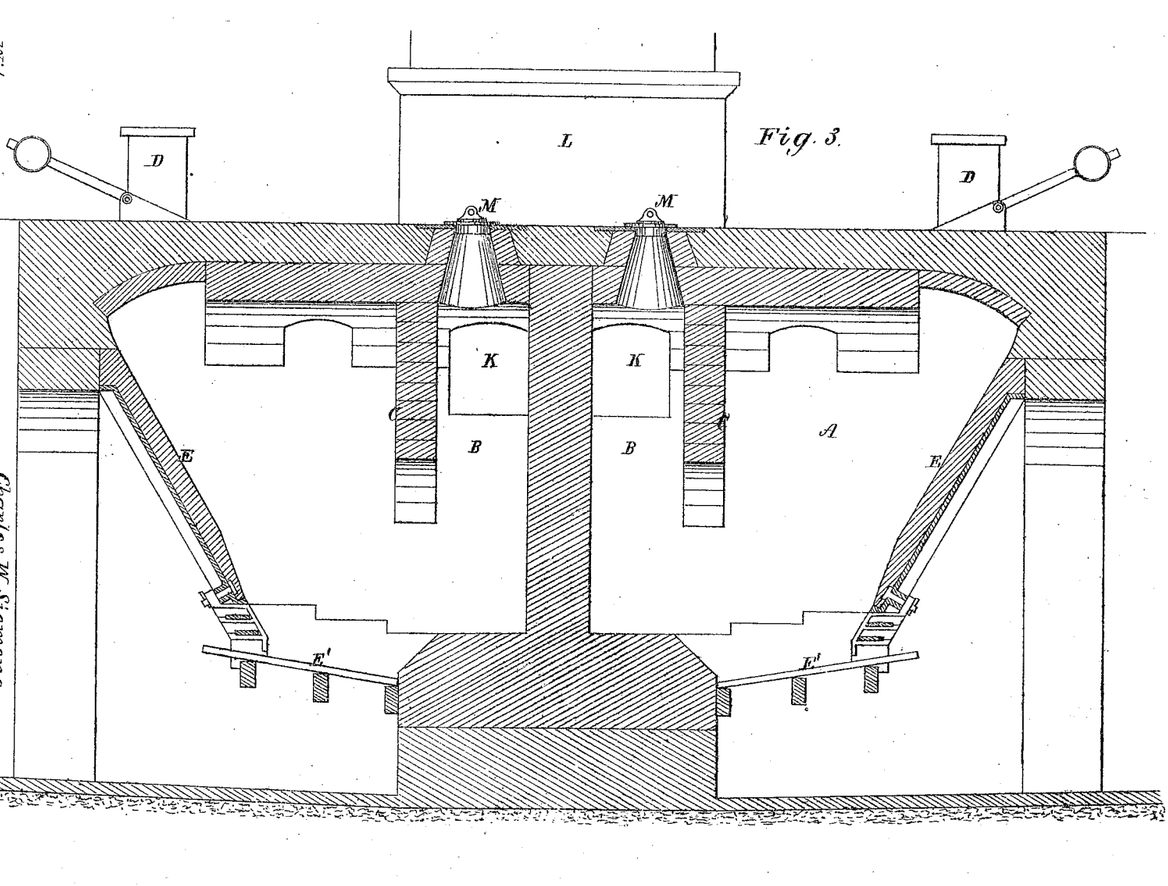

Fig. 3 shows a vertical section of another modification of the improved gas-producers. In this arrangement there is only one back chamber, B, formed by the division-wall C, and the volatile gases, instead of passing off from the top of the combustion-chamber, as in the previous arrangement, are caused to descend in this chamber to the bottom of the division-wall C, where, in passing into the chamber B, they are brought into intimate contact with the highly-heated lower portion of the layer of fuel, and, at the same time, are mixed with the highly-heated gases produced from such portion of the fuel. The volatile gases are thus decomposed and converted into permanent gases, as before described, and the combined gases then pass up through the chamber B and through the opening K into the gas-flue L. M is, as before, an aperture for clearing the chamber B from carbonaceous deposits. Our invention includes an improved construction of the heated gas and air passages or ports of regenerative gas-furnaces for the manufacture of glass and other purposes, (other than steel-melting furnaces,) for the purpose of producing a more effectual intermixture of the gas and air on entering into combustion. For this purpose the vertical air-ports are raised very nearly to the roof of the furnace, while the side walls of the flues are brought forward toward the heated chamber in a convergent manner until they meet, whereby the gas is introduced into the heated chamber below the air through channels or ports, increasing gradually in width toward the furnace, where it is met by the air passing in diverse directions. The tops of the gas-ports are covered in to a certain extent, whereby the gas in passing up the vertical passages is prevented from passing at once up through the stratum of air coming in through the raised air-ports, the gas being deflected by the covering, and caused to pass some distance forward through the diverging ports before coming in contact with the descending stratum of air; and, furthermore, the invention includes an improved construction of and mode of working glass pots or tanks of glass-furnaces. Heretofore the materials have been first charged into glass pots or tanks, then melted down, and then worked out completely, after which they have been recharged, and the process repeated, thus entailing considerable loss of time through the intermittent nature of the work, besides other disadvantages.

By our present improvement we render the process of glass-making a continuous and more uniform one, and we construct the glass pots or tanks with three separate compartments, in one of which the materials are introduced continuously or at short intervals, and from which the materials as they melt are caused to flow into the next compartment, where the operation of melting is completed, and whence the glass flows into the third compartment, where it is worked out continuously. To produce this circulation of the melted glass through the three compartments advantage is taken of the gradually-increasing specific gravity of the glass as the melting down thereof proceeds. By this means a stratification according to the condition of the mass is effected, allowing of its being subjected to different temperatures corresponding with the particular stage of preparation at which the several portions thereof have arrived.

Figure 4:
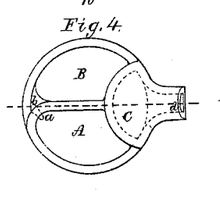
Figure 5:
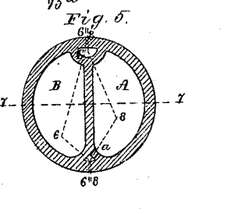
Figure 6:
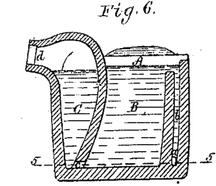
Figure 7:
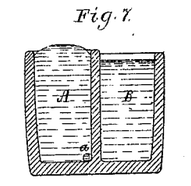
Figure 8:
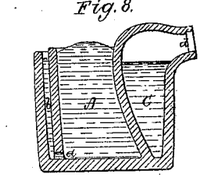

Figs. 4 to 8 and Figs. 9 to 14 of the drawing show the application of the invention to glass-pots. Fig. 4 shows a plan of the pot; Fig. 5, a sectional plan on line 5 5 of Fig. 6, the latter being a vertical section on line 6 6 6 of Fig. 5. Fig. 7 is a vertical section on line 7 7 of, and Fig. 8 a vertical section on line 8 8 8 of, Fig. 5.

The pot is constructed with three separate compartments, A B C, of which A serves to receive the raw materials, and communicates with the intermediate or clarifying compartment B by means of the aperture $a$ and the vertical passage $b$, while the compartment B communicates with the third or working-out compartment C through the aperture $c$ at bottom. The compartments A and B are open to the direct action of the flame, while the compartment C is closed in at top in order to protect it from such direct action of the flame, and it is provided with a nozzle, $d$, which projects through the working-aperture of the furnace, and through which the glass is worked out in a similar manner to ordinary glass-pots.

The two uncovered compartments A and D serve for the melting down and clarifying of the melted glass supplied to the working-compartment in the following manner: The raw materials are introduced in small quantities into the compartment A, which, as shown in the drawing, is maintained as nearly as possible in a filled condition. As the materials melt they will, by virtue of their increasing gravity, accumulate in the bottom of the compartment in such manner that the perfectly melted particles will be situated quite at the bottom, while the portions that are in a less perfectly melted condition will be stratified above the same, according to the degree of heat which they have attained. As the melting down proceeds, the lowest stratum in the compartment will pass through the aperture $a$ into the channel $b$, in which it will rise, and eventually flow over into the compartment B. As this compartment fills, a stratification of the material similar to that in A will take place, the most perfectly clarified and densest portion of the glass sinking to the bottom, while that which is less clarified and charged with air-bubbles will remain in the upper part, until by the action of the furnace-heat it becomes clarified in its turn, and is caused, by the continued entrance of fresh material from the passage $b$, to sink to the bottom, thereby forcing the lower stratum through the aperture $c$ into the compartment C. As the lower part of the glass-pot is cooler than the upper part, the compartment B serves both to clarify the glass in the upper part and to cool the same down in the lower portion, in which cooled condition the glass consequently enters the compartment C ready for working out. All three compartments are thus always filled with glass in different stages of preparation, the level of the glass being, however, different in each compartment, as shown on the drawing, corresponding with the respective differences of the mean specific gravity of the several contents.

It will be understood from the foregoing that in proportion as the glass is worked out of the compartment C fresh material must be charged into the compartment A, which operation is effected by the glass-blower, who, also, from time to time, skims the surface of the glass in the compartment B in order to remove impurities or imperfectly melted particles. By this improved construction of glass-pots it is rendered possible, while maintaining the furnace-heat at one uniform temperature, to effect the four different operations which are requisite for the perfect manufacture of glass—namely, the melting down of the materials, the clarifying of the melted mass, the cooling down thereof, and the working out of the cooled mass.

Figure 9:
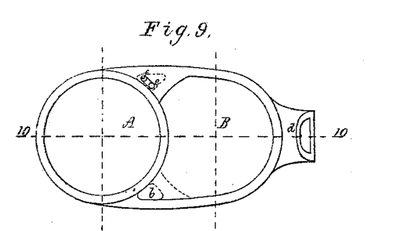
Figure 10:
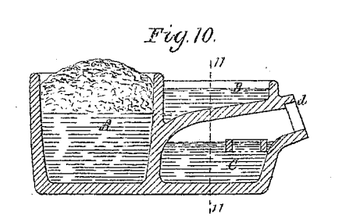
Figure 11:
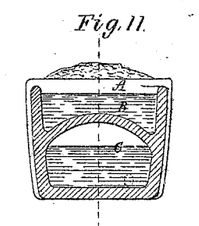
Figure 12:
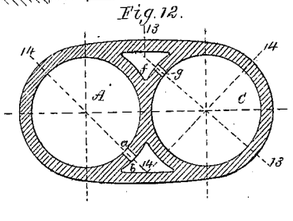
Figure 13:
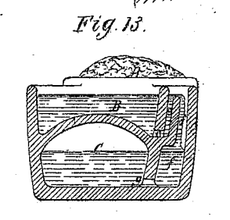
Figure 14:
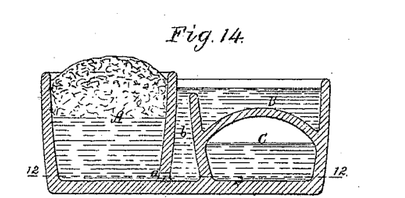

Figs. 9 to 14 show a modified form of the above-described improved glass-pot, Fig. 9 being a plan of the same. Fig. 10 is a vertical section on line 10 10 of Fig. 9; Fig. 11, a section on line 11 11 of Fig 10; Fig. 12, a sectional plan on line 12 12 of Fig. 14; and Figs. 13 and 14 are sections, respectively, on lines 13 13 13 and 14 14 14, Fig. 12. The general arrangement of the pot is the same as in that just described, the raw material being introduced into the compartment A, from which the melted glass passes into the compartment B, where it is clarified, and whence it descends into the closed compartment C, where it is worked out. The compartment B is, however, here formed over the compartment C, the melted materials being caused to pass from A, through the aperture $a$ and channel $b$, into B, from the bottom of which it first ascends through the apertures $c$ and channel $e$, and then flows over into the space $f$, communicating at bottom with the compartment C through the aperture $g$. From the arrangement of the passages $e$ $f$ it will be seen that, though the compartment B is raised entirely above the level of the glass in C, yet the glass will flow only into the latter compartment in precisely the same measure as it flows from A into B. In both the above-described arrangements of glass-pots the working-out compartment C, in place of being formed by a fixed partition in the compartment B, may be constructed as a loose compartment, in the form of a deep ring floating in the melted glass in the compartment B, so as to reach nearly to the bottom of the latter, through which ring the melted glass will rise from the compartment B in the same manner as is the case with the fixed compartment C.

Figure 15:
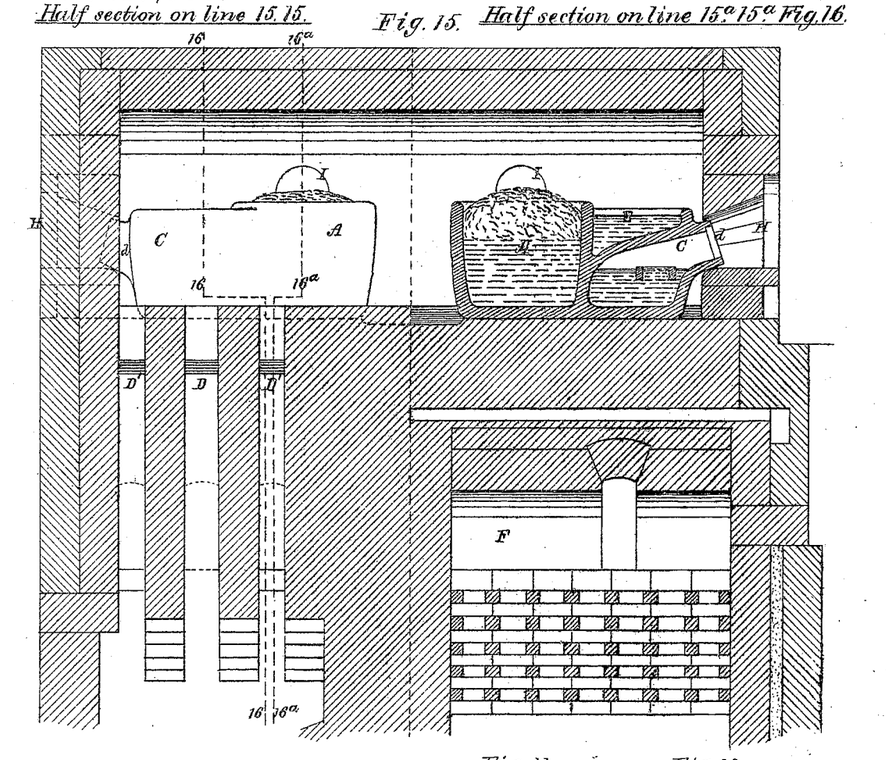
Figure 16:
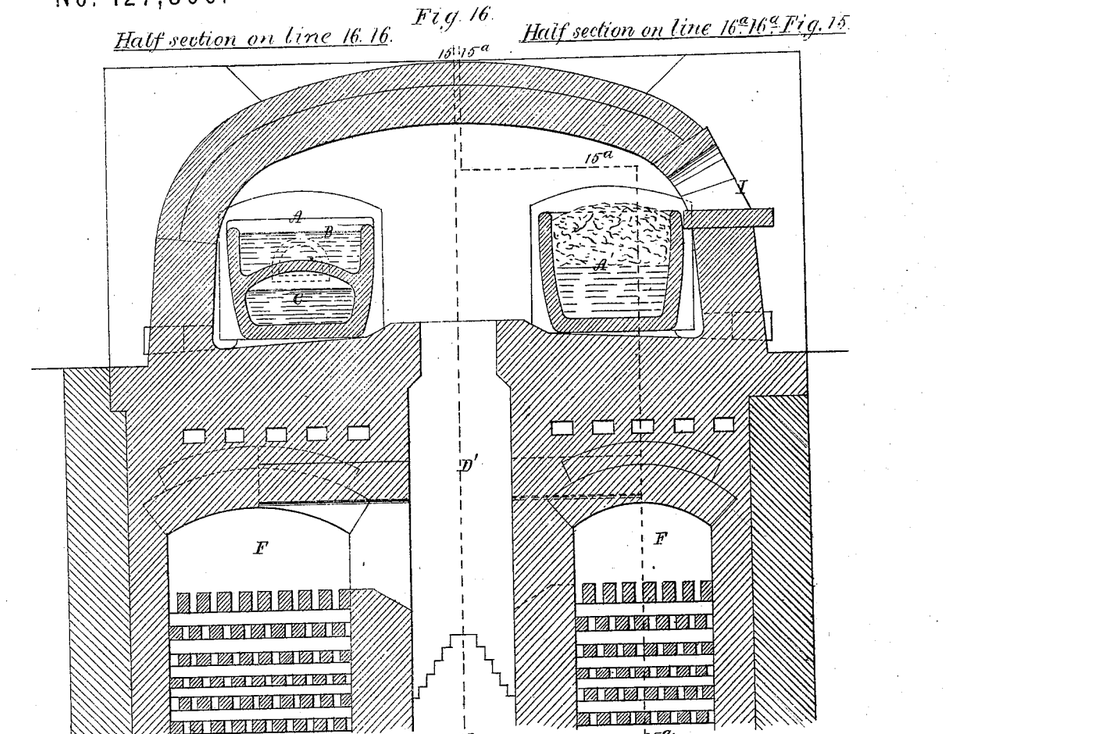

Figs. 15 and 16 show the mode of arranging these improved glass-pots in a regenerative gas-furnace. Fig. 15 shows a section on lines 15 15 and 15ª 15ª, Fig. 16; and Fig. 16 shows a section on lines 16 16 and 16ª 16ª, Fig. 15. The furnace is constructed to contain four glass-pots, A A, two of which are arranged on each side of the central gas and air flues D D' from the regenerators F F. The glass-pots are placed so that the nozzles $d$ of the compartments C project through the working-apertures H H in the end walls of the furnace, while the raw materials are charged into the compartments A A through the charging-apertures I I in the side walls of the furnace.

We do not herein claim the said furnace, and would remark, in connection with the before-described improved construction of glass-pots, that we are aware that glass-pots for melting down and reworking broken glass or glass lumps in a continuous manner have been constructed with a partition or with two compartments, into one of which the broken glass or glass lumps were introduced and melted down, and from which the melted glass was caused to flow into the second compartment, from which the glass was worked out; we do not, therefore, claim such a construction of glass-pots, they being, moreover, of but limited application, partly on account of the expensive nature of the materials, and partly because good glass cannot be manufactured from such materials alone.

Figure 17:
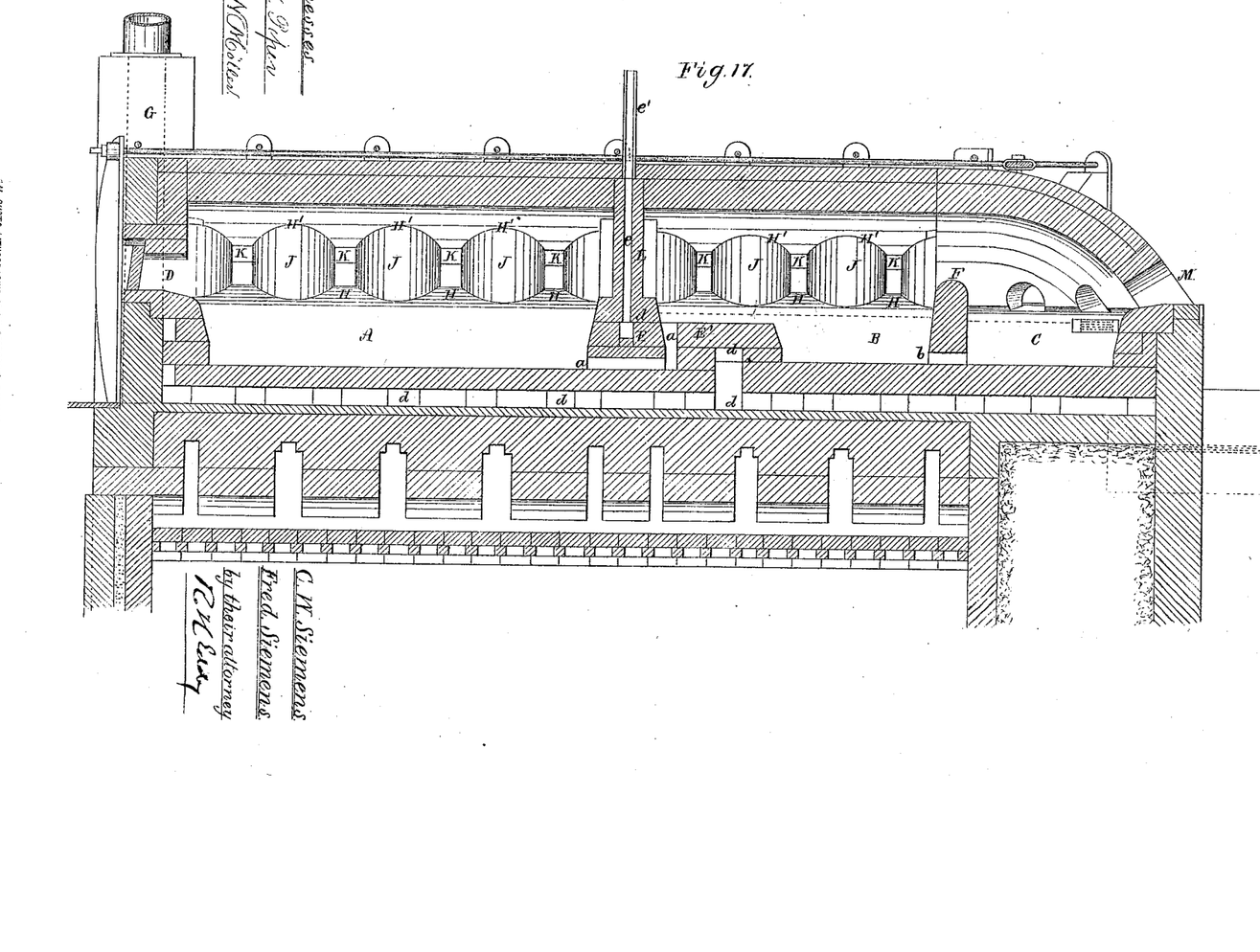
Figure 18:
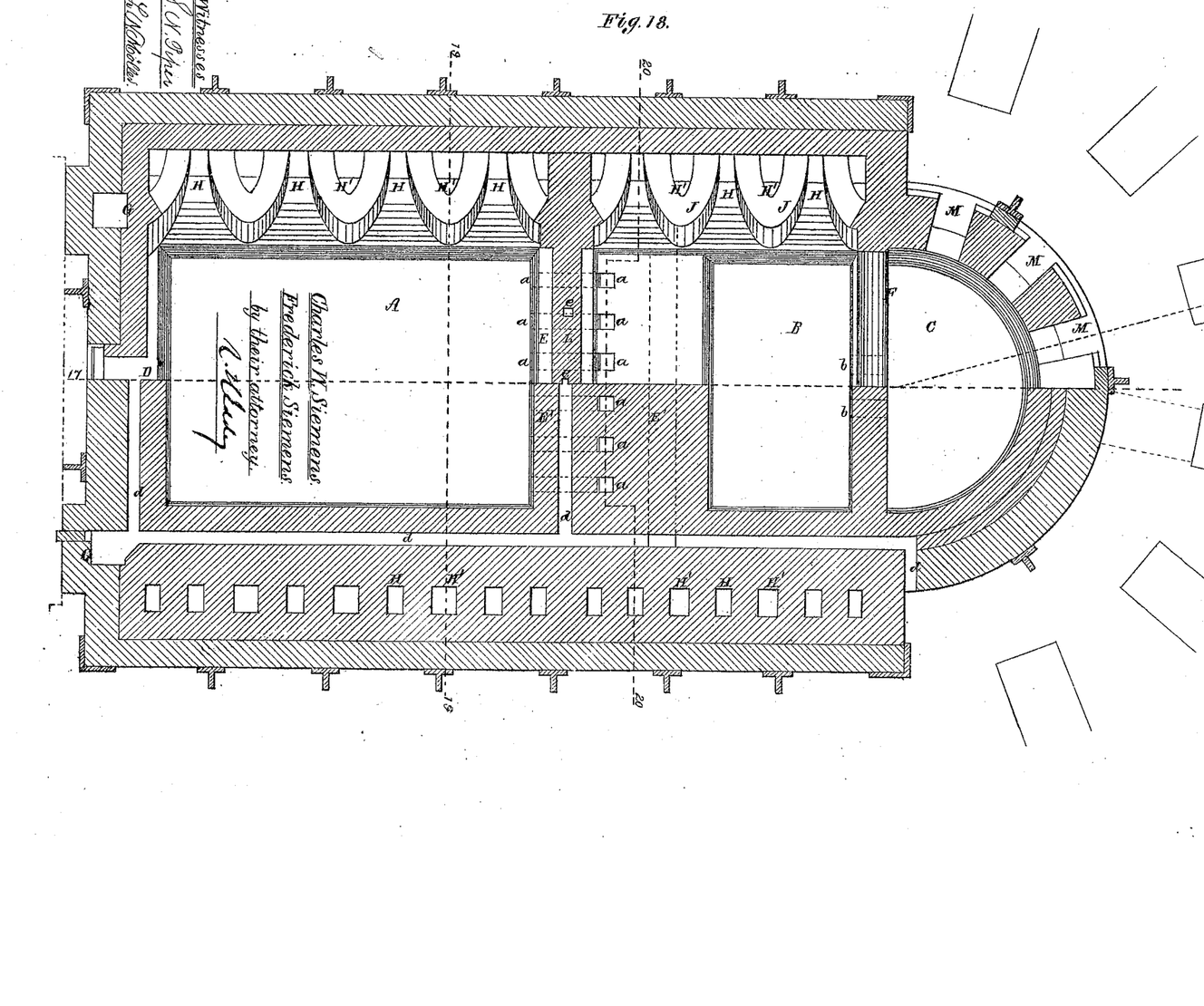
Figure 19:
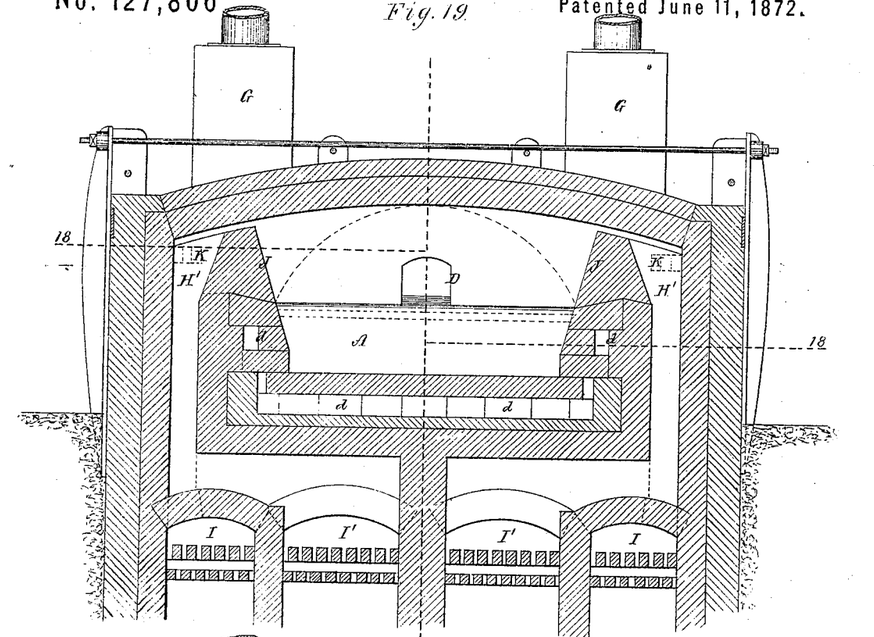
Figure 20:
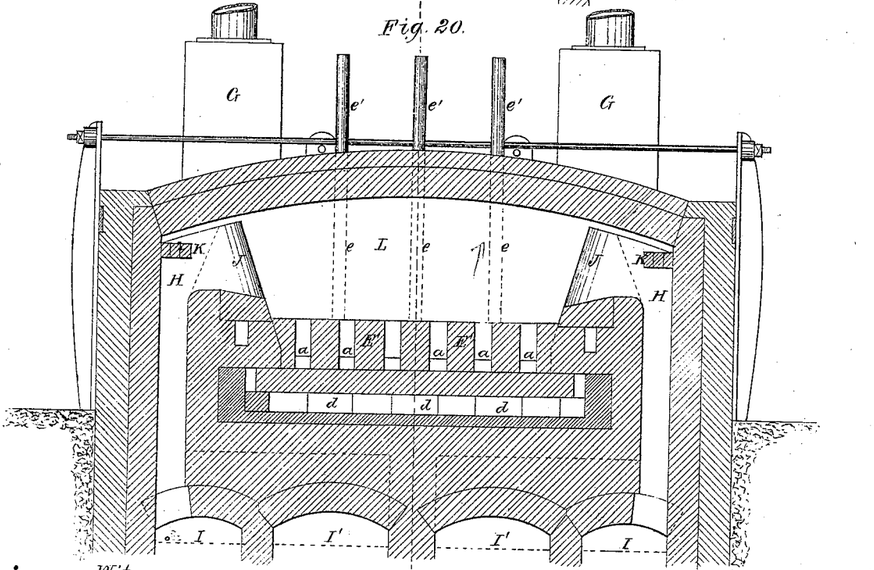

Figs. 17 to 20 of the drawing show the arrangement of the regenerative tank glass-furnace constructed according to this invention, with the before-described improved construction of gas and air ports. Fig. 17 shows a longitudinal section on line 17 17, Fig. 18. Fig. 18 shows a sectional plan on line 18 18, Fig. 19; and Figs. 19 and 20 show transverse sections, respectively, on lines 19 19 and 20 20, Fig. 18. The tank of the furnace is divided, similarly to the before-described glass-pots, into three separate compartments, A B C, of which A serves to receive the raw materials, while B is the clarifying-compartment, and C the working-compartment. The compartment A is fed with raw material through the charging-aperture D at the back end of the furnace. It is separated from the compartment B by the division-wall E E', in which a series of passages, $a\ a\ a$, is formed, passing first horizontally from the bottom of the compartment A, beneath the part E of the partition, and then rising vertically to the top of E'. Through these passages the melted glass passes from the bottom of A into the top of B, from the bottom of which compartment it flows into the compartment C through the passages $b$ formed through the bottom of the division-wall F. The division-walls E E', as also the sides and bottom of the tank, are formed with air-passages $d\ d\ d$, as shown, through which cold air is caused to circulate by the draught produced by the chimneys G G, with which these passages communicate. The tank is thus maintained in a cooled condition, so as to enable it the better to withstand any injurious action of the melted glass. The gas and air ports H H H' H' from the regenerators I I I' I' are arranged along each side of the tank, so as to cause the flames to play across the latter. The air-ports H H' are made to rise nearly to the roof of the furnace, as shown, the side walls J being brought forward in a convergent manner until they meet, while the gas-ports H H are covered in somewhat by fire-brick slabs K K, so as to deflect the combustible gases rising through the vertical passages and cause them to issue in a horizontal direction into the furnace underneath, the heated air issuing in diverse directions over the upper edges of the walls J. By these means an effectual intermixture of the combustible gas and air is produced, and the air is prevented from coming into immediate contact with the surface of the melted glass in the tank. By arranging the gas and air ports along the sides of the tank we are enabled to regulate the temperature in the different parts of the furnace according to the various stages of preparation of the glass in the several compartments, this regulation being effected by constructing the gas and air ports of larger dimensions at the compartment A, where greater heat is required than in the compartment B; and, in order the more effectually to maintain this requisite difference of temperature, the compartment A is, by preference, entirely separated from the other part of the furnace by means of the division-wall L, carried up to the roof of the furnace, which wall is provided with air-passages $e\ e$, communicating with chimneys $e'$ for keeping it cool. As before stated, the raw materials introduced into the compartment A, on being acted upon and melted down by the surface-heat there produced, gradually sink down to the bottom of the tank and pass thence up, through the passages $a\ a$, over the top of the partition or bridge E', into the compartment B. By being thus made to pass in a thin layer in immediate contact with the surface-heat of the furnace, the glass becomes perfectly clarified and sinks gradually to the bottom of the compartment. In thus passing away out of contact with the surface-heat into the lower portion of the tank cooled by the air-passages, the glass is cooled down to the requisite degree, in which state it passes through the passages $b$ into the working-compartment C, where it is worked out through the openings M M formed in the semicircular front end of the furnace. The compartment C is only heated by a portion of the flames in the compartment B passing in over the top of the partition-wall F and playing out of the working-apertures M, whereby this compartment is maintained at the requisite cooler temperature for working out the glass. This temperature may be effectually regulated by regulating the draught of the furnace-chimney, for, according as the draught is increased, a less amount of the flames will find their way over the compartment F.

If required, the partition-wall F might also be carried up to the roof of the furnace, so as to protect the working-out compartment C entirely from the direct action of the flames, in a similar manner to the compartment C of the glass-pots before described. As the glass, when melted down and clarified, should be exposed as little as possible to the further action of the furnace-heat, the compartments B and C are made shallower than A, in order to maintain only a comparatively thin layer of glass therein, which layer is cooled by the action of the cold-air passages in the sides and bottom of the tank. It has been stated that in the continuous circulation of the melted glass through the three compartments of the tank, as also of the glass-pots, advantage is taken of the circumstance that the specific gravity of the glass increases in proportion to its increase in temperature. This circumstance is, however, productive of one inconvenience—namely, that in those portions of the tank or glass-pot where the glass is caused to ascend in its forward motion the increasing density will tend to produce a stagnation of the particles, resulting in a deterioration of the mass. In order to counteract this tendency it is essential that the passages connecting the compartments A and B of the tank or glass-pot, in which the glass has an ascending motion, shall have only such a sectional area as is required for the rate of progress of the glass from one compartment to another.

The principal advantages resulting from the use of the above-described improved construction of furnaces, glass-pots, and tanks are, first, an increased power of production in the furnace, as the full melting heat may be employed in the same without interruption, instead of the intermittent action of furnaces of present construction; secondly, an economy in working, as less labor will be required for carrying on the operation than in the ordinary process; thirdly, a greater durability of the pots and tanks, owing to the uniform temperature to which they are subjected; and, fourthly, a much greater regularity of working, and more uniform quality of the products will be attainable thereby.

It will be readily understood that the before-described improved construction of glass pots and tanks may also be employed for melting other vitreous substances that admit of being prepared in a similar manner to glass.

Having thus described the nature of this invention, and in what manner the same is to be performed, what we claim is—

1. A regenerative gas-furnace gas-producer as made with one or more separate chambers or compartments behind the combustion-chamber, arranged in the manner described, so that the volatile gases given off at the upper portion of the layer of fuel in the combustion-chamber are caused to descend into the lower portion of the separate chamber or chambers, where they are brought into contact with the lower highly-heated portion of the fuel and with highly-heated surfaces, and are at the same time mixed with the heated permanent gases passing off from the lower portion of the fuel, substantially as and for the purposes hereinbefore set forth.

2. A gas-producer having two separate chambers or compartments behind the combustion-chamber, arranged in the manner described, so that the volatile gases given off at the upper portion of the layer of fuel are caused to enter at the top of one or other of the back chambers, where, in descending, they are brought into contact with extended heating-surfaces, and are then caused to mix with the permanent and highly-heated gases entering such chamber at the bottom; after which the combined gases are caused to ascend through and give off heat to the second back chamber, substantially as and for the purposes hereinbefore set forth and described with reference to Figs. 1 and 2 of the accompanying drawing.

3. The gas and air ports of regenerative gas-furnaces, constructed and arranged in the manner described, so that the vertical air-ports rise nearly to the roof of the furnace while the tops of the gas-flues are partly covered in at a lower level, the side walls of the flues being extended forward in a convergent manner until they meet, whereby the air is caused to issue into the furnace in diverse directions above the combustible gas, substantially as hereinbefore described with reference to Figs. 17 to 20 of the accompanying drawing.

4. A pot or tank for the continuous melting of glass and other vitreous substances as made or provided with three compartments arranged to communicate with each other in a manner that the raw material is introduced and melted down in the one compartment, from the lower part of which the melted material is caused to flow into the top of the next compartment, whence it passes into the bottom of the third compartment, from which it is worked out, substantially as and for the purposes hereinbefore set forth.

5. Glass pots or tanks constructed in the manner described, so that the compartment into which the raw material is introduced is open to the direct action of the flame, while the working-out compartment is closed against such direct action of the flame, and is consequently maintained at a lower heat, substantially as described with reference to Figs. 4 to 14 of the accompanying drawing.

6. Regenerative tank-furnaces for the continuous melting of glass and other vitreous substances as constructed with transverse partitions dividing the tank into three compartments, through which the melted materials are made to flow successively while the gas and air ports are arranged along each side of the tank, so as to cause the flame to play transversely across the same, allowing of the proper adjustment of heat in each compartment, substantially as hereinbefore described with reference to Figs. 17 to 20 of the accompanying drawing.

7. A regenerative tank glass-furnace constructed as aforesaid, and provided with a partition-wall for separating the compartment of the tank into which the raw material is introduced from the other compartments, in order to allow of different temperatures being maintained in the separate parts of the furnace, substantially as hereinbefore described with reference to Figs. 17 to 20 of the accompanying drawing.

In witness whereof we, the said CHARLES WILLIAM and FREDERICK SIEMENS, have hereunto set our signatures.

CHARLES WILLIAM SIEMENS.
FREDERICK SIEMENS.

Witnesses to signature of CHARLES WILLIAM SIEMENS:
S. CROWE,
W. FOLEY,
Clerks to Ridgway Bros., 2 Waterloo Place, Pall Mall, London, Notaries.

Witnesses to signature of FREDERICK SIEMENS:
O. H. IRISH,
O. ARNOUN.